J. REUTHER.
POTATO DIGGER.
APPLICATION FILED AUG. 17, 1909.
967,556.
Patented Aug. 16, 1910.
2 SHEETS—SHEET 2.
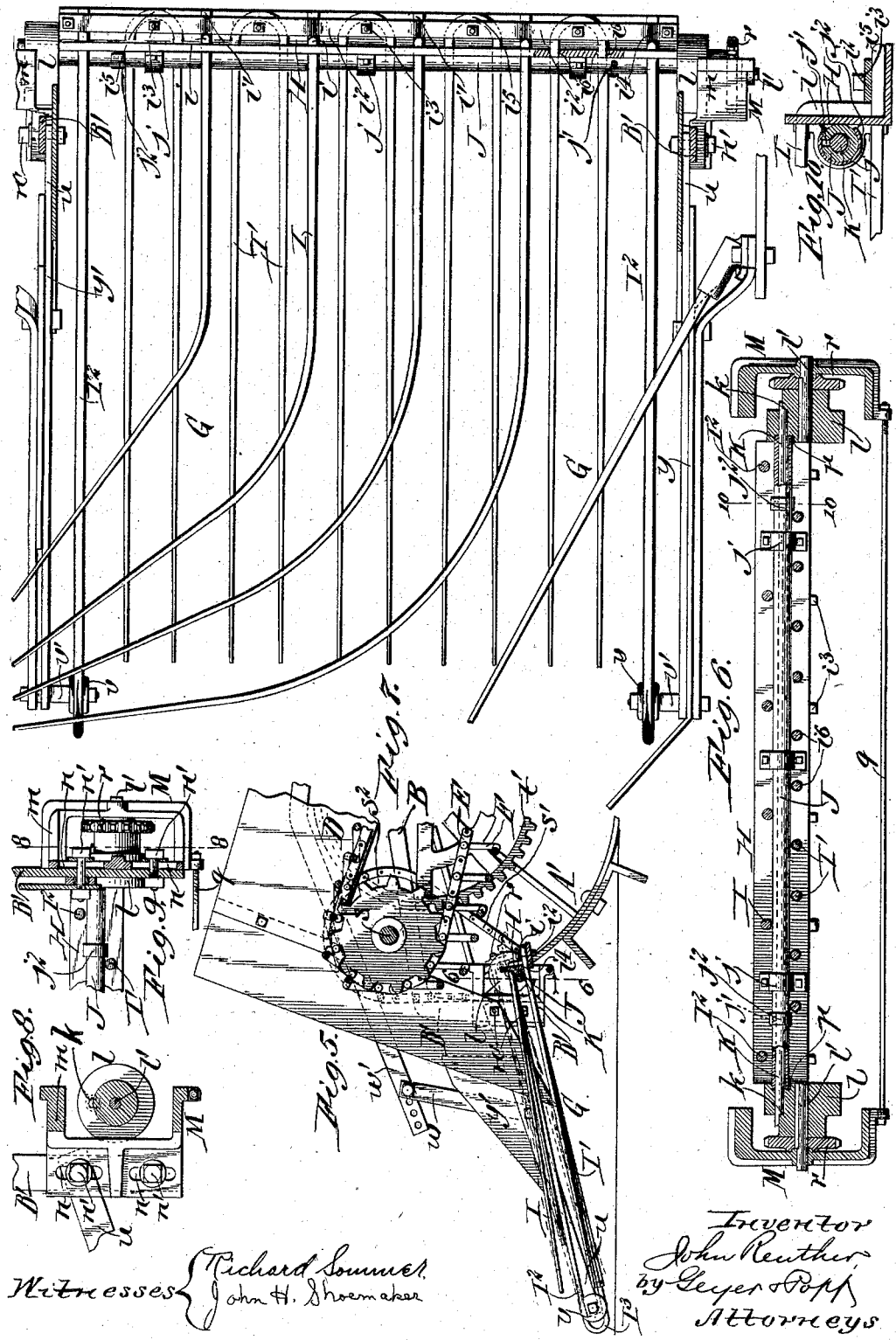

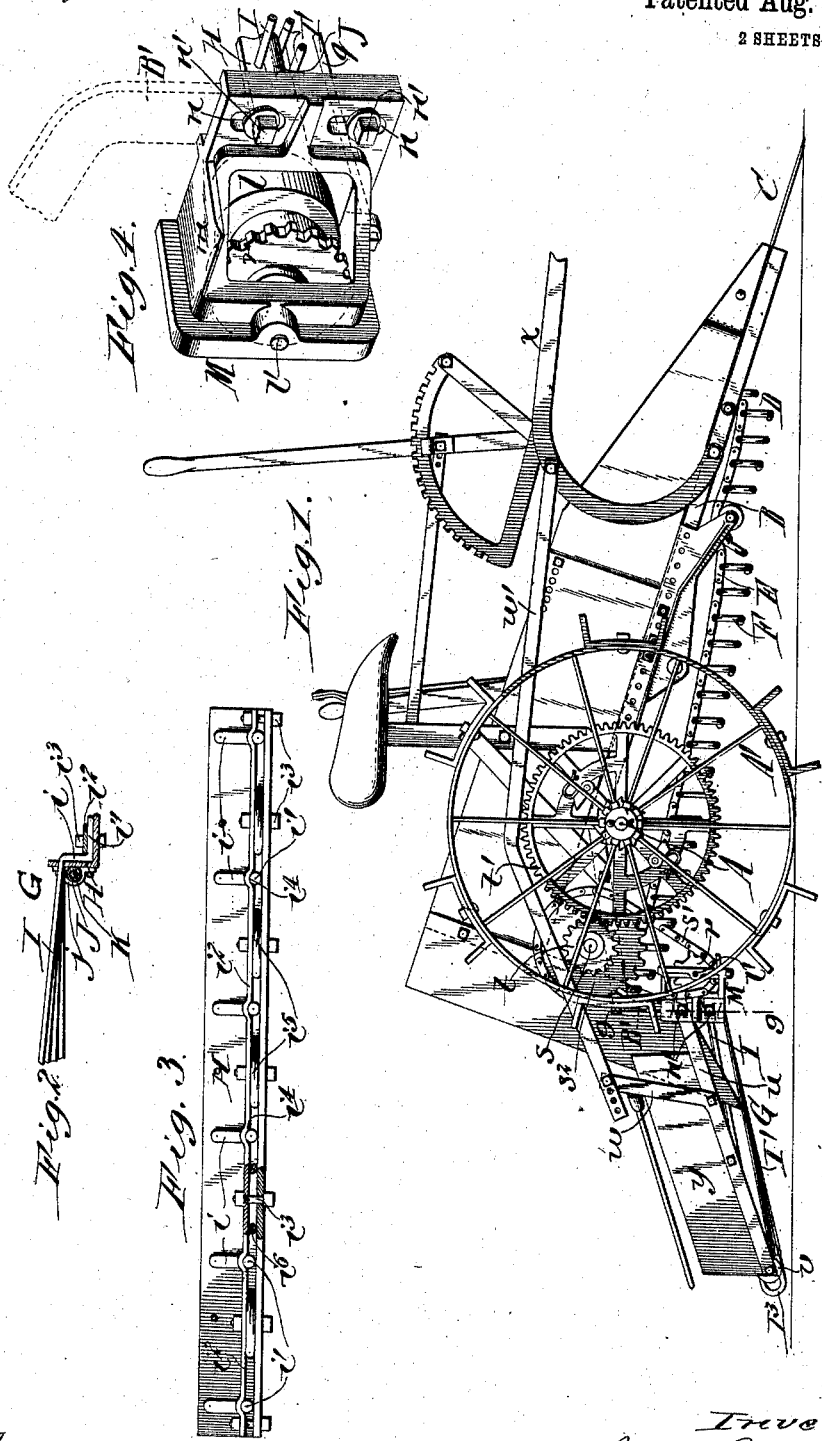

UNITED STATES PATENT OFFICE.

JOHN REUTHER, OF EAST AURORA, NEW YORK.

POTATO-DIGGER.

967,556.

Specification of Letters Patent. Patented Aug. 16, 1910.

Application filed August 17, 1909. Serial No. 513,232.

*To all whom it may concern:*

Be it known that I, JOHN REUTHER, a citizen of the United States, residing at East Aurora, in the county of Erie and State of New York, have invented a new and useful Improvement in Potato-Diggers, of which the following is a specification.

This invention relates to the class of potato diggers having a plow or digging blade, an endless elevator which receives the potatoes, earth and vines from the plow and effects a partial or main separation of the potatoes from the earth and vines, and a shaker or secondary separator which receives the potatoes and remaining soil and vines from the elevator and effects a further and final separation thereof.

One of the objects of the invention is to simplify the construction of the shaker and reduce its cost of production.

A further object is to improve the driving mechanism of the shaker with a view of increasing its strength and durability.

The invention has the further object to improve the shaker in other respects as will hereafter appear.

In the accompanying drawings consisting of 2 sheets: Figure 1 is a side elevation of a potato digger embodying the invention, the usual draft-truck and pole being omitted. Fig. 2 is a fragmentary longitudinal section of the shaker, on an enlarged scale. Fig. 3 is a front view of the shaker, partly in section. Fig. 4 is a perspective view of one of the crank shaft brackets and adjacent parts. Fig. 5 is a longitudinal central section of the rear portion of the machine, on an enlarged scale. Fig. 6 is an enlarged transverse section in line 6—6, Fig. 5. Fig. 7 is a sectional top plan view of the shaker, on an enlarged scale. Fig. 8 is a longitudinal section in line 8—8, Fig. 9. Fig. 9 is a fragmentary transverse section in line 9—9, Fig. 1, on an enlarged scale. Fig. 10 is an enlarged cross section in line 10—10, Fig. 6.

Similar letters of reference indicate corresponding parts throughout the several views.

A indicates the main axle of the machine on which the ground wheels $A^1$ are mounted in the customary manner. This axle carries the main frame, which, in the construction shown, includes forwardly-inclined side-bars B having vertical downward extensions $B^1$ at their rear ends.

C indicates a plow or digging blade of any suitable construction secured to the front end of the main frame, and D the elevator or main separator arranged in rear of the plow.

The elevator forms no part of the present invention and may be of any desired construction, that shown in the drawings consisting of a pair of endless sprocket chains E and cranked transverse rods F carried by the same.

G indicates the shaker or final separator the head of which is located underneath the discharge end of the elevator, so as to receive the potatoes, vines and remaining soil therefrom. This shaker comprises a cross head H preferably of angle iron, and upper and lower sets of tines or fingers I, $I^1$ extending rearwardly therefrom. The tines of the upper set are spaced farther apart than those of the lower set to allow the potatoes and soil to fall between them, but intercept the vines. As shown in Fig. 2, the shanks of the upper tines pass through openings in the vertical flange of the cross head H and are thence bent downwardly to form shoulders or offsets $i$ which bear against the latter, the front portions $i^1$ of the shanks being parallel with and resting upon the horizontal flange of the cross head to which they are secured, preferably by a continuous clamping bar $i^2$ overlapping the several shanks and secured at suitable intervals to the horizontal flange of the cross head by bolts $i^3$, or other fastenings. This bar may be provided on its underside with locking seats or depressions $i^4$ which receive said shanks, as best shown in Fig. 3, thus effectually preventing rocking or lateral displacement of the shanks on the cross head. The tines of the lower set are preferably double, the front portions of each pair being connected by an integral bow or bend $i^5$. The front portions of these lower tines pass through openings $i^6$ in the vertical flange of the cross head H, while their connecting bows $i^5$ are clamped down upon the horizontal flange of the cross head by the clamping bar $i^2$. This forms a simple, secure and inexpensive tine-fastening.

When it is desired to deliver the vines at the side of the machine, the rear portions of the upper tines I are bent or curved laterally, as shown in Fig. 7; but when they are to be delivered at the rear of the machine those tines are made straight in an obvious manner. The upper tines are removably secured to the cross head H by the clamping bar $i^2$ or equivalent means, so that straight tines can be readily substituted for the bent ones or vice versa, to adapt the machine for rear or side delivery as desired or required.

As shown in Figs. 5 and 6, the cross head H is provided on its rear side with a transverse bearing-tube or sleeve J which is rigidly secured thereto by straps $j$ or other suitable fastenings and which extends throughout the length of the cross head. This tube loosely surrounds a transverse crank shaft K carried by a pair of crank disks $l$ which are mounted on short shafts $l^1$. The outer ends of the latter are supported in bearings or brackets M carried by the frame extensions $B^1$. As best shown in Figs. 8 and 9, these brackets are preferably vertically adjustable, and for this purpose are provided with vertical slots $n$ for the passage of clamping bolts $n^1$ arranged in holes in the extensions $B^1$. The crank shaft K is preferably held against rotation as well as longitudinal displacement in the crank disks $l$ by any suitable means. In the construction shown in the drawings, the shaft passes through longitudinal openings formed partly in the bodies and partly in the hubs of the crank disks. The ends of the shaft are reduced and flattened on their inner sides, and the latter bear against the surface of the crank-disk hubs, as shown in Figs. 6 and 8, thus preventing the shaft from turning in said openings. The shoulders $k$ formed by reducing the ends of the shaft bear against the bottoms of said openings and hold the shaft against endwise displacement. It will be understood from the foregoing, that the rotation of the crank disks causes the crank shaft K to revolve about their axes, imparting an oscillatory up and down motion to the front portion of the shaker, as well as a longitudinal motion to the entire shaker, by which compound motion the material on the shaker is agitated and tossed rearwardly, thus effectually separating the vines and any remaining earth from the potatoes.

By extending the tube or sleeve J throughout the length of the cross head H, the tube affords a long and extensive bearing for the cross head on the crank shaft K, producing a strong and durable construction. This tube is preferably provided in its upper side with one or more holes $j^1$ through which oil may be fed into the same for lubricating the parts, the tube forming an oil conduit or reservoir and being for this purpose of somewhat larger internal diameter than the diameter of the crank shaft K. These oil holes are preferably closed by removable dirt-caps consisting of split elastic bands $j^2$ which embrace the tube, as seen in Figs. 6 and 10.

To check waste or discharge of the oil at the ends of the tube J, the latter is seated at its ends in recesses $p$ formed in the opposing faces of the crank-disks $l$.

As shown, the lower portions of the brackets M are preferably united by a tie rod $q$. The shouldered crank shaft serves not only as a means of driving the shaker, but also acts as a space member which resists inward movement or deflection of the crank disks under the tension of the tie rod $q$. It also aids in retaining the crank disks in axial alinement. The shafts $l^1$ of the crank disks may be driven by any suitable means. In the construction shown, they are provided with sprocket wheels $r$ which are driven from a transverse shaft $s$ by sprocket chains $s^1$ running around sprocket wheels $s^2$ secured to said shaft and around the wheels $r$. The shaft $s$ is driven from the ground wheels by gear wheels $t$, $t^1$, or other suitable means.

As shown in Figs. 4 and 9, the brackets M are provided at their upper ends with inwardly-extending flanges or guards $m$ which overhang the sprocket wheels $r$ and serve to exclude soil and vines therefrom, preventing clogging of the driving mechanism. By making these brackets vertically adjustable on the frame members $B^1$, wear of the sprocket chains $s^1$ can be taken up, when necessary.

The shaker is provided at opposite sides with longitudinal supporting bars $u$, the front ends of which are pivoted upon the upper bracket-bolts $n^1$, so that said bars can swing vertically relatively to the main frame of the machine. At their rear ends these bars are provided with grooved circular blocks or guides $v$ which are mounted on transverse studs $v^1$ projecting inwardly from the bars. These guides support the outermost tines $I^2$ of the upper set, the rear portions of which are bent around the guides in the form of hooks or loops, as shown at $I^3$, thereby supporting and guiding the rear portion of the shaker. The rear portion of the shaker is normally supported at the proper elevation by upwardly-extending arms $w$ secured to the side bars $u$, and links $w^1$ connecting said arms with members $x$ of the draft frame, or by any other suitable means.

$y$, $y^1$ indicate the side walls of the shaker which are secured to the side bars $u$, one of these walls, $y$, extending to the rear end of the shaker, while the other wall $y^1$ terminates some distance short of said end to permit lateral delivery of the vines at that side of the machine.

I claim as my invention:

1. In a potato digger, the combination of a frame, a transverse crank shaft supported thereon, and a shaker comprising side bars connected with said frame and extending rearwardly therefrom, guides carried by said bars, a cross-head mounted on said crank shaft, and tines extending rearwardly from said cross head, some of said tines engaging said guides.

2. In a potato digger, the combination of a frame, a transverse crank shaft supported thereon, and a shaker comprising side bars connected with said frame and extending rearwardly therefrom, grooved guide-blocks carried by the rear portions of said side-bars, a cross head mounted on said crank shaft, and tines extending rearwardly from said cross-head, some of said tines having hook-shaped rear ends which engage the grooves of said guide blocks.

3. In a potato digger, the combination of a frame, opposing brackets secured thereto, a tie-rod connecting the lower portions of said brackets, crank disks journaled on said brackets, means for rotating the disks, a crank shaft carried by and connecting said disks, and a shaker having its head journaled on said crank-shaft.

4. In a potato digger, the combination of a frame, opposing crank disks journaled thereon and having longitudinal openings, a crank-shaft having shouldered ends seated in the openings of said disks, and a shaker having its head journaled on said crank shaft.

5. In a potato digger, the combination of a frame, opposing crank disks journaled thereon and having longitudinal openings formed partly in the disks and partly in their hubs, a crank shaft seated in said openings and having reduced and flattened ends which extend beyond said openings and bear against the surface of said disk-hubs, and a shaker having its head mounted on said crank shaft.

6. In a potato digger, the combination of a frame, a transverse crank shaft supported thereon, and a shaker having a bearing tube surrounding said shaft and extending throughout the width of the shaker.

7. In a potato digger, the combination of a frame, a transverse crank shaft supported thereon, and a shaker having a bearing tube surrounding said shaft and provided with an oil hole.

8. In a potato digger, the combination of a frame, opposing crank disks journaled thereon, a crank shaft connecting said disks, said disks having recesses in their opposing sides, and a shaker having a bearing-tube surrounding said crank shaft and seated at its ends in said recesses, said tube having an oil hole.

Witness my hand this 6th day of August, 1909.

JOHN REUTHER.

Witnesses:
C. F. GEYER,
ANNA HEIGIS.